US012169723B2

(12) United States Patent
Dean

(10) Patent No.: US 12,169,723 B2
(45) Date of Patent: Dec. 17, 2024

(54) SYSTEM FOR SIMULTANEOUS RECORDING OF THE PIXELS OF A SCREEN AND OF ACCESSIBILITY DATA

(71) Applicant: RealityMine Limited, Manchester (GB)

(72) Inventor: Graham Nigel Dean, Cheshire (GB)

(73) Assignee: REALITYMINE LIMITED, Manchester (GB)

( * ) Notice: Subject to any disclaimer, the term of this patent is extended or adjusted under 35 U.S.C. 154(b) by 0 days.

(21) Appl. No.: 18/079,413

(22) Filed: Dec. 12, 2022

(65) Prior Publication Data

US 2023/0185588 A1 Jun. 15, 2023

Related U.S. Application Data

(60) Provisional application No. 63/288,792, filed on Dec. 13, 2021.

(51) Int. Cl.
| | |
|---|---|
| *G06F 3/048* | (2013.01) |
| *G06F 9/451* | (2018.01) |
| *G06F 21/55* | (2013.01) |
| *G06F 21/64* | (2013.01) |
| *G11B 27/34* | (2006.01) |
| *H04N 5/76* | (2006.01) |

(52) U.S. Cl.
CPC ............ *G06F 9/451* (2018.02); *G06F 21/554* (2013.01); *G06F 21/645* (2013.01); *G11B 27/34* (2013.01); *H04N 5/76* (2013.01); *G06F 2221/034* (2013.01)

(58) Field of Classification Search
CPC ...... G06F 9/451; G06F 21/554; G06F 21/645; G06F 2221/034; G06F 2201/865; G06F 11/3438; G11B 27/34; H04N 5/76
See application file for complete search history.

(56) References Cited

U.S. PATENT DOCUMENTS

| | | | | |
|---|---|---|---|---|
| 9,747,191 | B1* | 8/2017 | Marolia | G06F 11/3466 |
| 11,340,968 | B1* | 5/2022 | Malamut | G06F 9/547 |
| 2011/0314343 | A1* | 12/2011 | Hoke | G06F 11/3672 |
| | | | | 714/45 |
| 2017/0032138 | A1* | 2/2017 | Navda | G06F 21/6218 |
| 2018/0210814 | A1* | 7/2018 | Mevorach | G06F 11/3644 |
| 2018/0280803 | A1* | 10/2018 | Projansky | A63F 13/63 |

* cited by examiner

*Primary Examiner* — Thanh T Vu
(74) *Attorney, Agent, or Firm* — Danielle C. Sullivan; Carter, Ledyard & Millburn U.P

(57) ABSTRACT

A method and system for simultaneous recording of the pixels of a screen in the form of a video and at least one of: events received via an accessibility API and snapshots of the UI obtained via an accessibility API. All captured elements are associated with timestamps such that the video, events and UI snapshots can retrospectively be replayed and retain their synchronisation. The recording is performed via an app that runs on the same device being recorded and the recorded session may be uploaded to server via a network. A second app, running on a second device may be used to download the recorded sessions and be used to play, pause, and scrub, such that the pixels, accessibility events and the UI can be inspected at any time from the recorded session.

16 Claims, 7 Drawing Sheets

| Property | Value |
| --- | --- |
| level | 8 |
| text | S1:E1 "Out of the Deep Woods" |
| contentDescription | |
| className | android.widget.TextView |
| viewId | com.netflix.mediaclient:id/player_title_label |
| isVisible | true |
| isEnabled | true |
| isSelected | false |
| isChecked | false |
| isCheckable | false |
| isFocused | false |
| isFocusable | false |
| isAccessibilityFocused | false |
| isClickable | false |
| isLongClickable | false |
| isPassword | false |
| isScrollable | false |
| isEditable | false |
| paneTitle | |
| drawingOrder | 9 |
| isContentInvalid | false |
| isContextClickable | false |
| liveRegion | 0 |
| isMultiLine | false |
| canOpenPopup | false |
| isDismissable | false |
| isImportantForAccessibility | true |
| isScreenReaderFocusable | false |
| isShowingHintText | false |
| isHeading | false |
| isTextEntryKey | false |
| hintText | |
| error | |
| stateDescription | |
| tooltipText | |
| packageName | com.netflix.mediaclient |
| bounds | [147,48][2133,99] |

FIGURE 4C

EXEMPLARY COORDINATOR ically with regards to the user interface elements and
SYSTEM FOR SIMULTANEOUS RECORDING OF THE PIXELS OF A SCREEN AND OF ACCESSIBILITY DATA This application claims priority to U.S. Provisional Patent Application No. 63/288,792 filed Dec. 13, 2021, entitled "A SYSTEM FOR SIMULTANEOUS RECORDING OF THE PIXELS OF A SCREEN AND OF ACCESSIBILITY DATA" and is hereby incorporated by reference herein.

FIELD OF THE INVENTION

This invention relates to a method and system to record and retrospectively inspect user interfaces of applications; specifically with regards to the user interface elements and events exposed via an accessibility Application Programming Interface ("API").

BACKGROUND OF THE INVENTION

Accessibility APIs, also called automation APIs, herein simply referred to as "Accessibility APIs" exist within operating systems, such as Android and Windows. Accessibility APIs allow third-party developers to interact with a user interface of other applications or an operating system user interface, such as settings screens. They can be used to allow the development of applications that assist users with disabilities, or who may temporarily be unable to fully interact with a user device. Accessibility APIs may also be used for automation of interaction with user interface elements, or the measurement of the use of applications.

When looking to automate or measure the use of another application, it is necessary to understand how the other applications exposes its user interface elements via an accessibility API. Generally, applications do not document or publish this information so there still exists a need to discover what user interface elements the other application exposes via the accessibility API and how those user interface elements can be identified.

Apps generally contain a plurality of screens, which are comprised of many user interface elements. The exact screens and user interface elements displayed depend on the state of the application, which in turn can depend on factors such as geography, time, account of the user, logged in/out state, state of the device, etc. Given these large number of variables and in order to thoroughly inspect an app for the information it exposes via an accessibility API, it is necessary to record the information exposed via an accessibility API for a variety of screens and app states.

Various tools exist to help developers ensure their apps are accessible to users with disabilities. Generally, these tools, such as the Android Studio Layout Inspector, are focussed on inspecting the user interface of a developer's own app via the accessibility APIs, giving the developer visibility of how their app appears to the accessibility API. Furthermore, tools, such as the Android Accessibility Scanner app, may focus on showing user interface elements that require accessibility improvements, rather than showing all the user interface elements.

Other tools allow snapshots of the entire user interface to be taken on any app and may also simultaneously take a screenshot of the pixels from the screen. Such tools take only individual snapshots and require user interaction to initiate the taking of snapshots, therefore making the task of capturing many screenshots laborious. These tools, such as the Android uiautomaterviewer tool, may also require the user device be physically connected to a second device and transferring the snapshots to the second device.

SUMMARY OF THE INVENTION

The present invention provides a system and method that allows the recording of the user interface as exposed via an accessibility API and overcomes the disadvantages of the prior art. The present invention provides a method and system for simultaneous recording of the pixels of a screen, in the form of a video, for example, and simultaneously snapshots of the UI obtained via an accessibility API. All recorded/captured elements are associated with timestamps such that the video and UI snapshots can retrospectively be replayed and retain their synchronisation. Additionally, events received via the accessibility API, such as clicks, scrolls, and/or changes to UI elements, may also be simultaneously recorded and synchronised to the video. Collectively, these captured/recorded data are grouped into a "session" for the duration of the recording.

By recording videos of both the pixels of the screen and snapshots of the accessibility information, this allows a number of possibilities not currently possible. The present invention allows the retrospective inspection of app(s) across a plurality of screens and app states without any loss or filtering of accessibility information. It also provides the ability for the performing of logic, for example automation or measurement algorithms, against a session in a repeatable manner, the sharing of sessions with other users, the archiving of sessions, the ability to rapidly develop, test and maintain accessibility rules, and help scale the measurement of many apps/services.

The present invention provides a system for simultaneously recording and capturing data to provide a view of user interface elements exposed on a user's device, the system including an accessibility application programming interface, a recording device, wherein the recording device records a video of the user device screen, at least one user interface element simultaneously captured by the accessibility application programming interface, a clock timer, wherein the clock timer provides a timestamp of the recorded video and the at least one user interface element, a storage device, wherein the recorded video and the at least one user interface captured element are stored together as a session.

The present invention provides a method for simultaneous recording of a screen on a user device in the form of a video and at least one user interface element, the method including recording a video of pixels of a screen on a user device and entering a recording state, marking the video with a timestamp with the video start time, simultaneously capturing at least one user interface element captured via an accessibility application programming interface during the recording state, simultaneously recording the video and the at least one interface element until the user selects to stop recording, exiting the recording state, synchronizing the recorded video and the at least one captured snapshot for playback.

BRIEF DESCRIPTION OF THE DRAWINGS

A more detailed understanding of the invention may be had from the following description of a preferred embodiment, given by way of example and to be understood in conjunction with the accompanying drawing:

FIGS. 4a, 4b and 4c show an exemplary user interface hierarchy exposed via an accessibility API.

DETAILED DESCRIPTION OF THE INVENTION

The present invention provides a method and system that exists inside an app, service, driver, component, or process running on an operating system, herein referred to as "the inventive system." The inventive system must have permission to have at least read-only access to the accessibility application programming interface ("accessibility API") of the operating system. This permission may require that the user perform some steps to grant the inventive system the access required, for example, changing some settings within the operating system, accepting permission prompts, and/or entering a password, or the like.

Additionally, the inventive system must have permission to record from the screen of the user device. This permission may also require that the user perform some steps to grant the inventive system the access required, for example, changing some settings within the operating system, accepting permission prompts, and/or entering a password, or the like.

The inventive system records a session wherein snapshots of the user interface are taken via the accessibility API and synchronized with a video of the screen pixels that are simultaneously recorded. A session is a collection of gathered information that includes the video of pixels of the screen, "snapshots" of the user interface as exposed via the accessibility API, and optionally, accessibility events received via the accessibility API, all of which are associated with timestamps. A "snapshot", as used herein, of the user interface obtained via an accessibility API consists of a collection of hierarchical data structure of user interface elements representing the state of the user interface at a given time. Each element has a number of properties such as view identifier, text, content description, view class etc. The elements form a hierarchical data structure by having one element at the root with zero or more elements as child elements of the root element. Subsequent elements may have zero or more child elements, forming a hierarchical data structure of arbitrary breadth and depth. The "snapshot" of the user interface obtained via an accessibility API does not contain a visual representation of the user interface elements thus is distinct from a screenshot, image, pixels or other purely visual representation.

Figure 1:
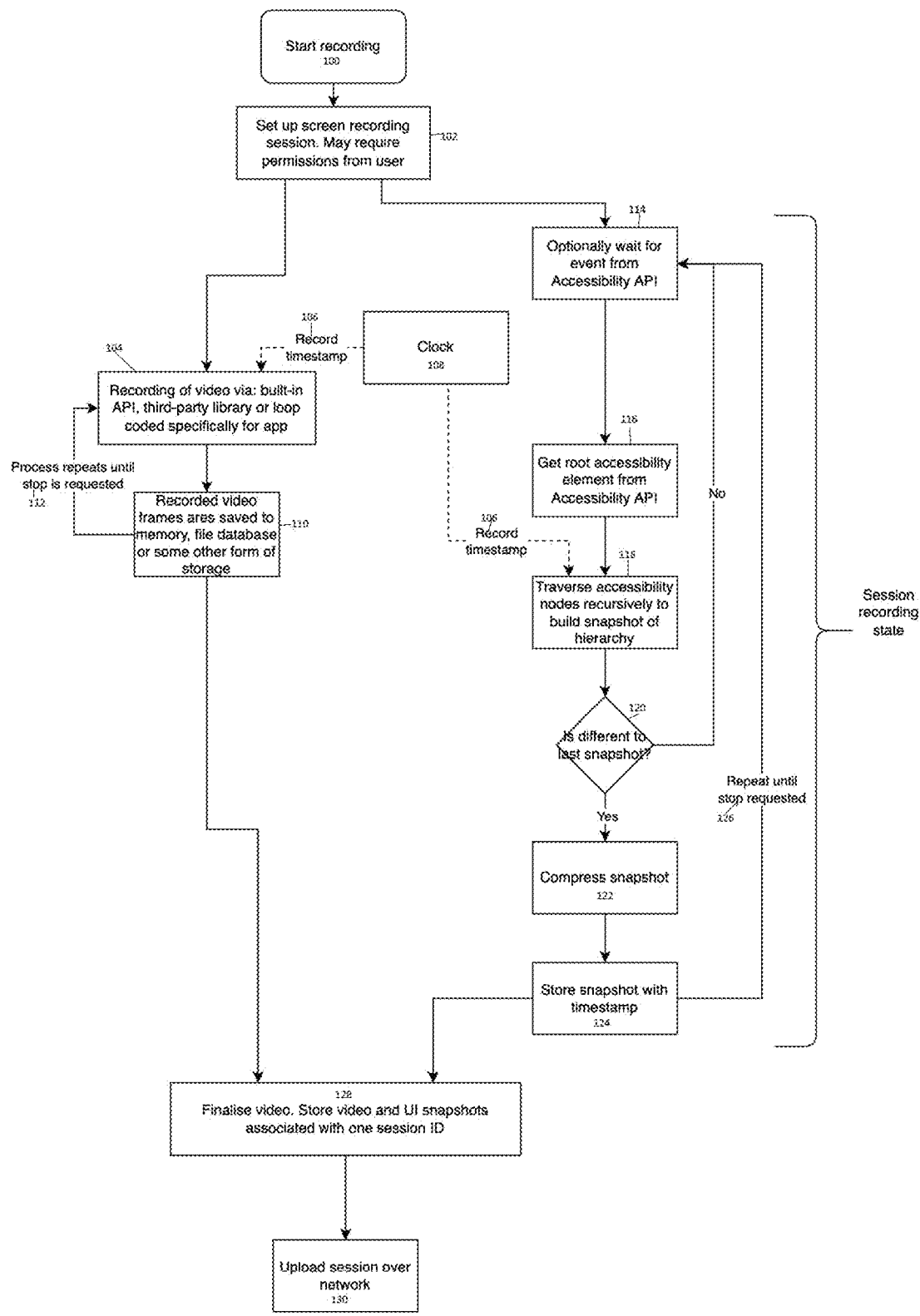
FIG. 1 shows an exemplary process flow chart of the present invention of simultaneous recording of video and user interface snapshots.

FIG. 1 shows an exemplary embodiment of a process flow chart for the present invention for simultaneous recording of video and user interface snapshots. The inventive system provides the user with the option to start recording a session 100. For screen recording to begin, it may be necessary for the user to grant the inventive system permission to read the accessibility API and recording of the screen 102 on the user device. (Depending on the operating system, the order of the option to start recording and granting permission may be reversed). When the option to start recording a session is activated, the inventive system begins recording a video 104 of the user device screen and also enters a loop, or state, to record snapshots of the user interface via data the accessibility API. The recording of the video may be accomplished via an application programming interface (API) exposed via the operating system, via some readily available software library integrated into the inventive system or coded specifically for the inventive system 110. At the point at which the video recording component has confirmed that recording has started, a timestamp 106 is stored locally that represents the current clock timer 108 of the device. Clock timer 108 may be a "wall clock" timer representing the current time of day, or may be a system timer, such as the time since the last boot of the user device. Using a system timer is advantageous because it cannot be manipulated by the user, thus not subject to user introduced errors.

The inventive system then enters a recording state within which, multiple snapshots of the user interface elements exposed via the accessibility API are stored locally on the user device 124. The recording state may represent a loop of continuous polling 114 of the accessibility API, or it may represent a state where accessibility events trigger the reading of the accessibility API, or that some other events or triggers cause the reading of the accessibility API, or some combination of these. Events or triggers include events received via the accessibility API, such as clicks, scrolls, window focus changes, window content changes, and/or changes to UI elements, In the case of a loop, the loop runs on a background thread so as not to block the user interface of the device.

Each time the reading of the accessibility API is triggered 114 when in the recording state, the aim is to record a complete as possible view of all the user interface elements exposed on the user device via the accessibility API. A trigger event may include: a combination of accessibility events, timer events, window events such as the window and components of the currently focussed/foreground app, the window and components of non-focussed/background apps, input events such as, mouse or keyboard events, and the user interface elements of operating system components such as menus, status bar, taskbar etc. or other system events. The aim is to respond to any events that may indicate a change in the user interface such that the accessibility API can be queried for potential changes in the user interface. The user interface elements exposed via the accessibility API are queried recursively, starting at the root most item 116, such that a hierarchy of elements is discovered, forming a snapshot of the user interface 118. This snapshot is built up and stored temporarily within the memory of the user device. A query is run and the snapshot is then compared 120 with the previously captured snapshot and if it differs, or if this is the first snapshot of the session, the snapshot is stored within the local storage area of the inventive system (e.g., the file system, local database, persistent storage layer or the like), otherwise the snapshot can be discarded.

Since querying and storing the full hierarchy of all the user interface elements may take some time, thus limiting the rate at which snapshots can be taken, several techniques may be employed to minimize the time querying for and storing of the snapshots. For example, if accessibility events are used to trigger the querying of the accessibility API, then only specific accessibility event types may result in a full query of the user interface elements. Other event types may only result in a partial query of the user interface (to just those elements indicated by the event to have changed) or no query required (in the case where the event represents an event that does not result in a user interface change). Additionally, the most recently captured snapshot may be compared against the previously captured snapshot and only the differences be recorded. Comparing the captured snapshots to a last captured snapshot is an optional optimization. It may also be desirable to apply a compression algorithm (e.g., GZIP, Brotli) to the snapshot data 122 before storage to minimize the storage capacity required for the snapshot and session. The snapshot may be stored 124 in a format that is suitable for representing hierarchical data such as JSON, XML, a SQL database such as SQLite or a NoSQL store such as MongoDB).

For each snapshot, at least one clock timestamp is recorded that represents one of: the time at which the snapshot process started or the time at which the snapshot ended. This clock timer 108 may be a "wall clock" timer representing the current time of day or may be a system timer such as the time since the last boot of the device but should be chosen so that it can be compared with the timestamp recorded for when the video started. Generally, the same type of clock should be used for all timestamps, to ensure they are comparable and equivalent.

The recording process continues to simultaneously record video and captured snapshots of the user interface elements as exposed via the accessibility API until the user selects an option to stop recording 126. The option to stop recording may be in the form of a button, or similar, within the recording app or may be an option integrated into an operating system feature such as the status bar, notification area, menus, keyboard shortcut, or similar. Once the option to stop recording has been selected, the inventive system exits the recording state and may optionally store some metadata associated with the session that has been recorded, such as the total time recording, numbers of snapshots, numbers of accessibility events, foreground apps seen during the session, etc. The inventive system may also need to finalize the storage of all the data 128 that has been recorded so far such that all the data, for example, the video, all snapshots, and/or metadata, can be associated with a single session identifier. This identifier may be in the form of a timestamp, globally unique identifier (GUID), device identifier, user input value or some combination of these values or other values. The finalized session can then be uploaded over the network 130.

Figure 2:
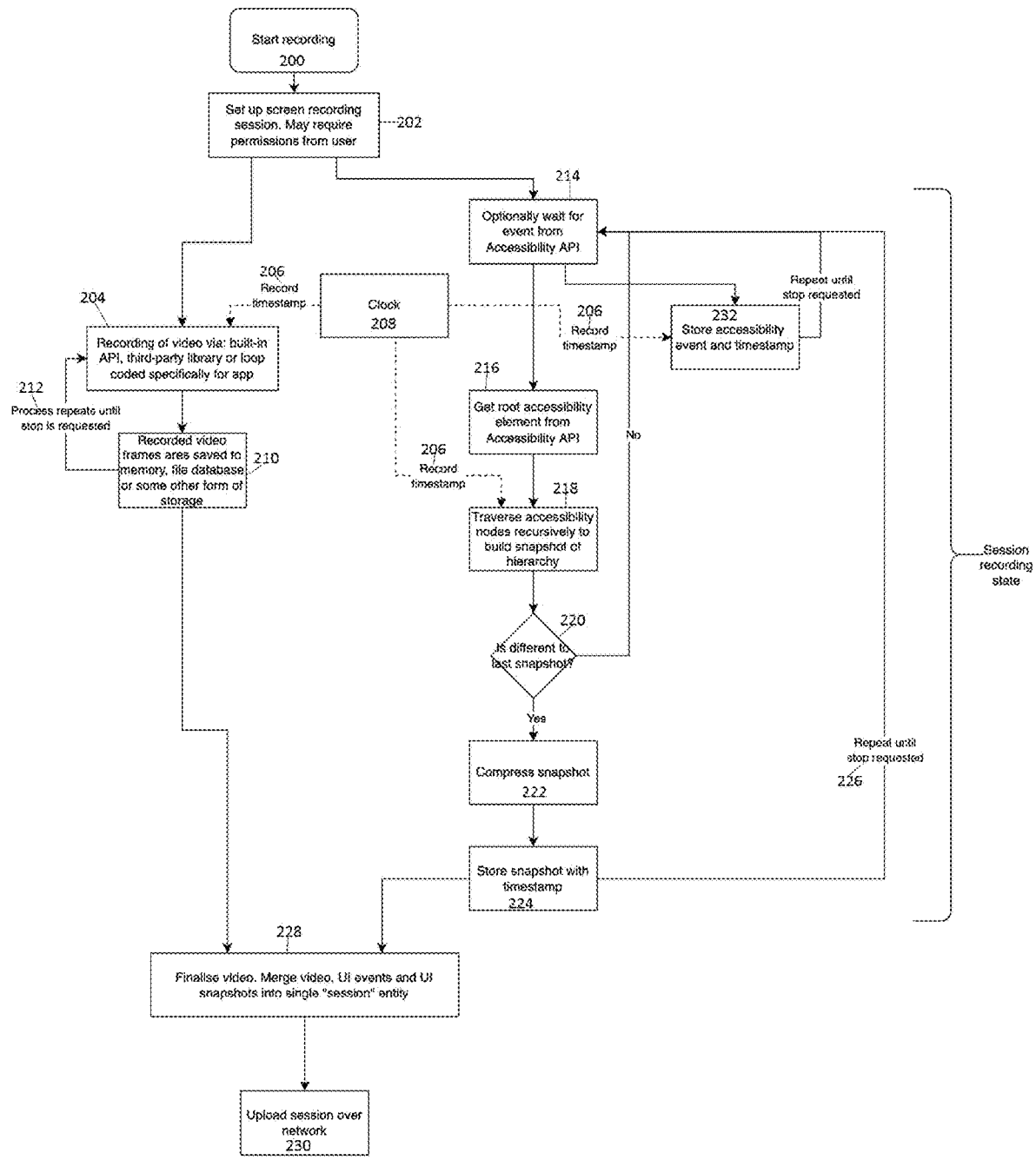
FIG. 2 shows an exemplary process flow chart of the invention for simultaneous recording of video, user interface events and user interface snapshots.

In addition to storing the video and snapshots of the user interface elements exposed via the accessibility API, the inventive system may also record, and store user interface events, such as clicks, scrolls, window focus changes, window content changes, and/or changes to UI elements, for example, received via the accessibility API. This is shown in FIG. 2, where the inventive system is simultaneously recording video, user interface snapshots and user interface events. Similar to FIG. 1, the inventive system provides the user with the option to start recording a session 200. For Screen recording to begin, it may be necessary for the user to grant the inventive system permission to read from the accessibility API and recording of the screen 202 on the user device. When the option to start recording a session is activated, the inventive system begins recording a video 204 of the screen and also enters a loop, or state, to record accessibility data. The recording of the video may be accomplished via an application programming interface (API) exposed via the operating system, via some readily available software library integrated into the inventive system or coded specifically for the inventive system. At the point at which the video recording component has confirmed that recording has started, a timestamp 206 is stored locally that represents the current clock timer 208 for the device. Clock timer 208 may be a "wall clock" timer representing the current time of day, or may be a system timer, such as the time since the last boot of the device. An advantage of using a system timer is that it is not manipulatable by the user, thus not subject to user introduced errors.

The inventive system then enters a recording state within which, multiple snapshots of the user interface elements exposed via the accessibility API are stored locally 224. The record state may represent a loop of continuous polling of the accessibility API, or it may represent a state where accessibility events, such as clicks, window focus, window content changes or window scrolls, trigger reading of the accessibility API, or that some other events or triggers, such as a timer or window event, cause the reading of the accessibility API, or some combination of these 214. In the case of a loop, the loop should run on a background thread so as not to block the user interface of the inventive system.

Each time the reading of the accessibility API is triggered 214 when in the recording state, the aim is to capture/record a complete as possible view of all the user interface elements exposed on the device via the accessibility API. This may include: the window and components of the currently focussed/foreground app, the window and components of non-focussed/background apps and the user interface elements of operating system components such as menus, status bar, taskbar etc. The user interface elements exposed via the accessibility API are queried recursively, starting at the root most item 216, such that a hierarchy of elements is discovered, forming a snapshot of the user interface 218. This snapshot is built up and stored temporarily within the memory of the device. The user interface snapshot is then compared 220 with the previously captured snapshot and if it differs, or if this is the first snapshot of the session, the snapshot is stored within the local storage area of the inventive system (e.g., the file system, local database, persistent storage layer or the like). If it is the same as the previously captured snapshot, the new/current snapshot can be discarded.

It may also be desirable to apply a compression algorithm (e.g., GZIP, Brotli) to the snapshot data 222 before storage to minimize the storage capacity required for the user interface snapshot and session. The user interface snapshot may be stored 224 in a format that is suitable for representing hierarchical data such as JSON, XML, a SQL database such as SQLite or a NoSQL store such as MongoDB).

For each user interface snapshot recorded and user interface events recorded, at least one clock timestamp is recorded. Each timestamp 232 for an event represents when the event was received. This clock timer 208 may be a "wall clock" timer representing the current time of day or may be a system timer such as the time since the last boot of the device but should be chosen so that it can be compared with the timestamp recorded for when the video started. Generally, the same type of clock should be used for all timestamps, to ensure they are comparable and equivalent.

As previously discussed, user interface events include events received via the accessibility API, such as clicks, scrolls, window focus changes, window content changes, and/or changes to UI elements. Similar to the user interface snapshots that are captured/recorded, the user interface events are also recorded and timestamped when the event is received. As events are received, they may be stored in memory, or may be written to persistent storage in format suitable for representing a collection of events with associated timestamps, such as JSON, XML, a SQL database such as SQLite or a NoSQL such as MongoDB.

As previously discussed, the recording process continues to simultaneously record video, user interface snapshots and user interface events as exposed via the accessibility API until the user selects an option to stop recording 226. The option to stop recording may be in the form of a button, or similar, within the recording app or may be an option integrated into an operating system feature such as the status bar, notification area, menus, keyboard shortcut, or similar. Once the option to stop recording has been selected, the inventive system exits the recording state and may optionally store some metadata associated with the session that's been recorded, such as the total time recording, numbers of snapshots, numbers of accessibility events, foreground apps seen during the session, etc. The inventive system may also need to finalize the storage of all the data 228 that's been recorded so far such that all the data, for example, the video, all user interface snapshots, user interface events and/or metadata, can be associated with a single session identifier. This identifier may be in the form of a timestamp, globally unique identifier (GUID), device identifier, user input value or some combination of these values or other values. The finalized session can then be uploaded over the network 230.

The inventive system may include an option to list the recorded sessions, which may include options to delete sessions or view information about each session, for example, preview the recorded video, view the user interface snapshot data, view the user interface events etc. One or more recorded sessions may be uploaded to a remote server, over a network. Uploading a session transfers all the data associated with that session to the remote server. Optionally, once the upload has been successful, the session may be removed from storage within the inventive system.

Figure 3:
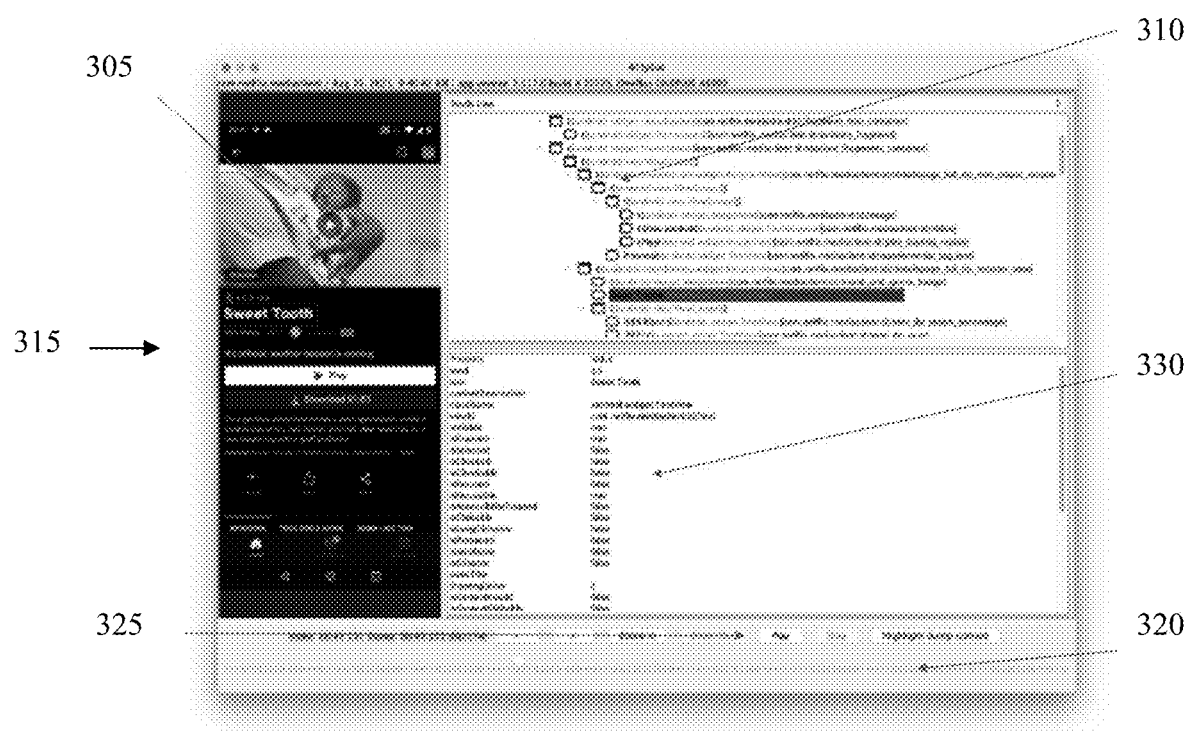
FIG. 3 shows an exemplary embodiment of the present invention using a second app replaying a previously recorded session.

A second app may be created for the purpose of replaying previously recorded sessions and inspecting the data contained with the session as shown on FIG. 3. The second app may run on the same device as the inventive system but does not need to be run on the same device or operating system as the inventive system. For example, it may be that the inventive system runs on a mobile device such as a smartphone and the second app runs on a desktop computer.

The second app allows connection to a remote server such that the sessions recorded from the inventive system can be downloaded. The second app may support the listing and previewing of sessions before all the data associated with the session is downloaded. An option to download a session is included and when selected, the full session, for example, all data associated with the session, is copied from the remote server to the local storage of the device running the second app.

Once a session has been copied to the local storage of the device running the second app, the session may be replayed, and the contents of the session inspected. Specifically, a video may be played within the session 305 and as the video is played, the user interface elements captured via the accessibility API are also displayed and synchronized in time with the video 315. Additionally, if the session contains accessibility user interface events, these may also be displayed alongside the video and user interface snapshots 320, for example. The most recent event may be displayed as the video is played or scrubbed, or the events may be marked on a timeline representing the duration of the session. (The inventive system can also replay sessions and inspect the contents of the session as discussed above without the second app).

Controls 325 may be used to scrub the video so that any time position with the session can be immediately viewed. Other controls may exist such as those to play, pause, move to the next or previous frame, next or previous user interface snapshot or next or previous user interface accessibility event, for example.

A summary of the user interface snapshots may be displayed 310 in a number of different ways, such as a tree structure with the parent-child relationship of the elements preserved; a flattened list, where all elements are tabulated; or the elements may be represented as wireframes alongside or overlaid on top of the video. The items in the tree or list may be a summary representation of the complete user interface element, for example, just to display the text or ID of the element. A full list of properties for a user interface element 330 may be shown separately for a selected item.

Figure 4A:
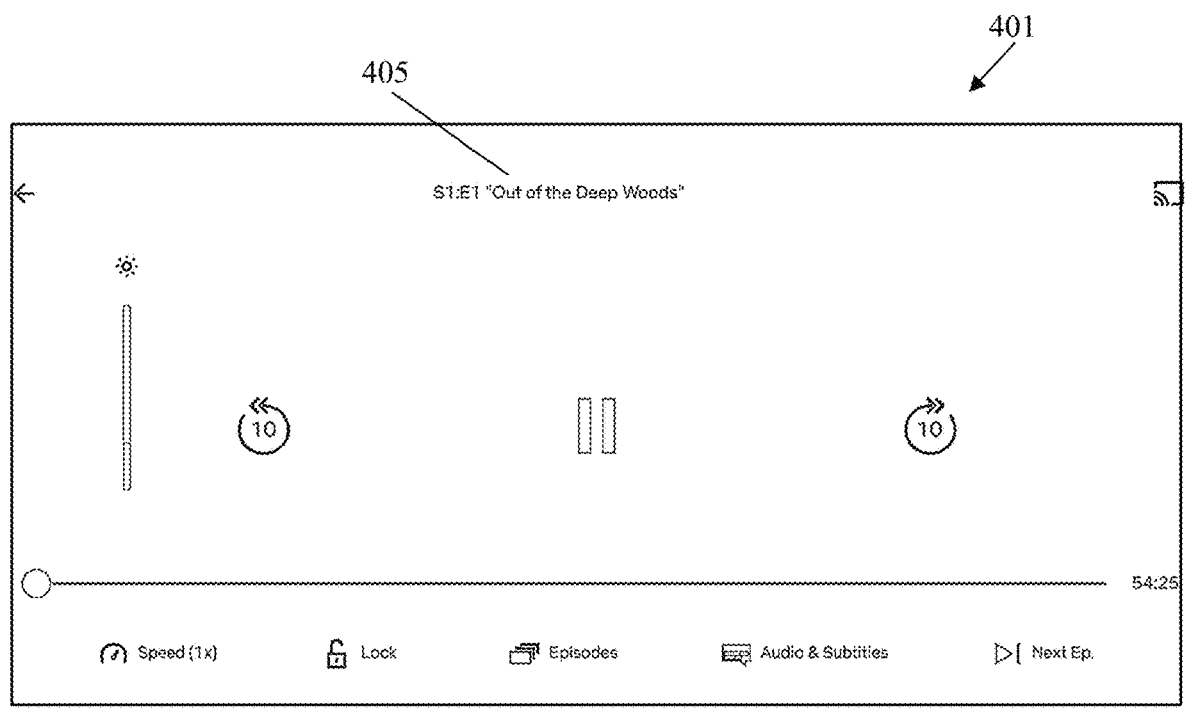
Figure 4B:
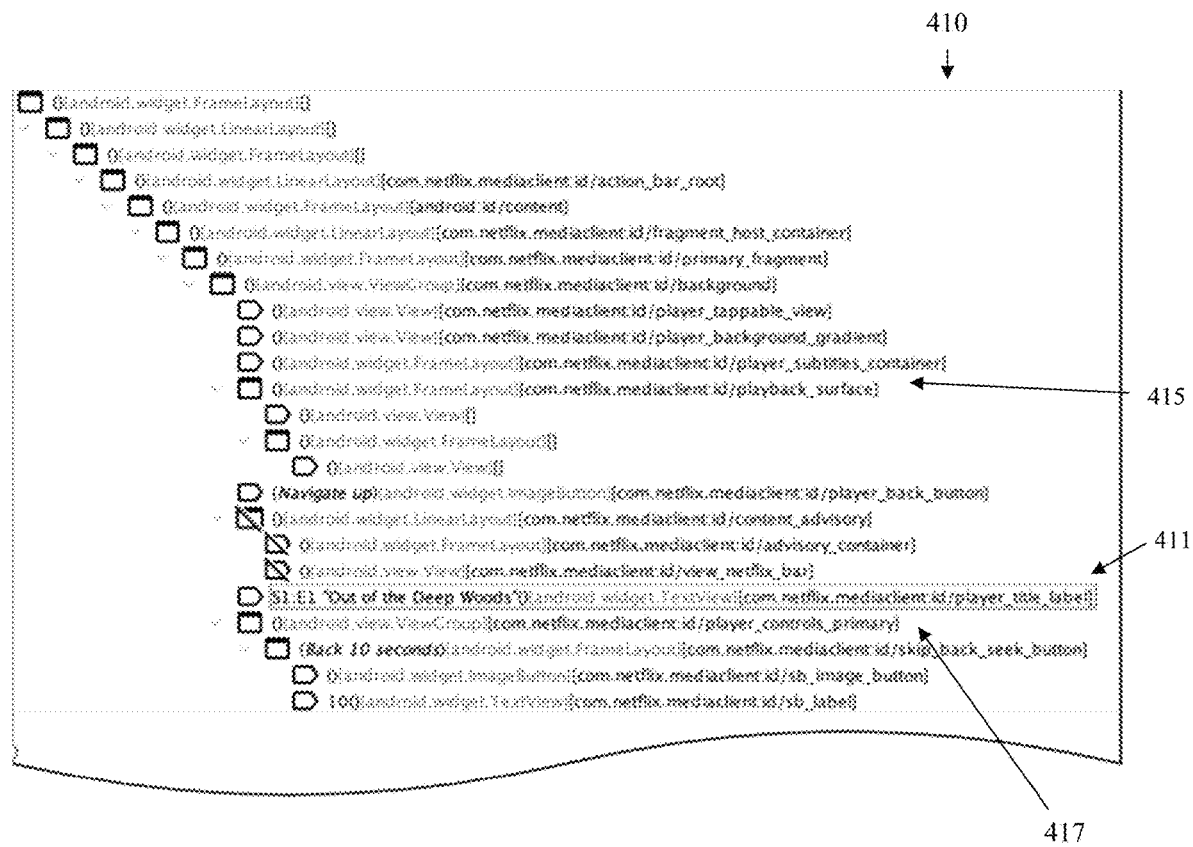

FIGS. 4a, 4b and 4c show an exemplary user interface hierarchy of the present invention, exposed via an accessibility API. In FIG. 4A, an exemplary user interface (e.g., for a mobile device, for a website) for a third-party app is illustrated. Screen 401 shows various user interface elements currently displayed by the UI of the third-party app, including a player title label 405.

In FIG. 4B, a snapshot (e.g., a current UI state) 410 that may be obtained via the accessibility API and corresponding to the displayed user interface shown in FIG. 4A is illustrated. In one embodiment, the current UI state may comprise a hierarchical data structure of user interface elements representing the state of the user interface of the third-party app at a given time. For example, the current UI state may include a player_title_label element 411 corresponding to the player_title_label 405, a playback surface element 415 and a player_controls_primary element 417. In one implementation, each element may have a number of properties such as a view identifier, text, a content description, a view class, and/or the like. In one embodiment, the elements may form a hierarchical data structure by having one element at the root with zero or more elements as child elements of the root element. Subsequent elements may have zero or more child elements, forming a hierarchical data structure of arbitrary breadth and/or depth. (The snapshot of the user interface obtained via the accessibility API does not contain a visual representation of the user interface elements of the third-party app, thus is distinct from a screenshot, image, pixels or other purely visual representation).

In FIG. 4C, an exemplary data structure 420 showing property fields and property values associated with the player_title_label element 411 is illustrated. For example, a text property field 421 stores the text displayed by the player_title_label 405, a packageName property field 425 identifies the third-party app, and a viewId property field 427 identifies the player_title_label element 411.

By displaying a representation of the user interface elements alongside the corresponding frame in the video, it becomes possible to see the exact state of the user interface as exposed via the accessibility API at a specific moment. This aids with the development of processes or programs to automate or measure the state of other apps via the use of an accessibility API.

Coordinator

Figure 5:
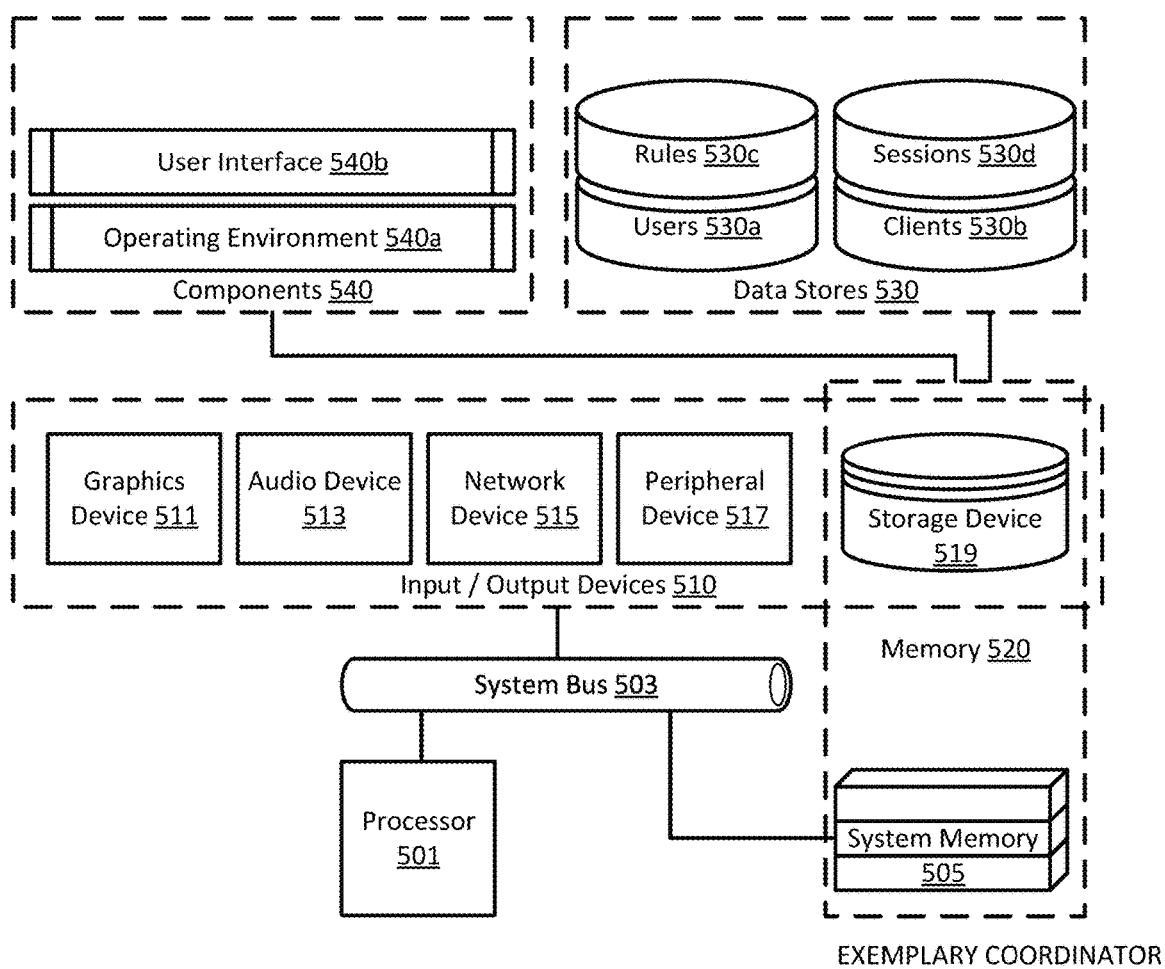
FIG. 5 shows a block diagram illustrating an exemplary coordinator in one embodiment of the inventive system.

FIG. 5 shows a block diagram illustrating an exemplary coordinator for use with the inventive system. The coordinator facilitates the operation of the inventive system via a computer system (e.g., one or more cloud computing systems (e.g., Microsoft Azure, Amazon Web Services, Google Cloud Platform), grid computing systems, virtualized computer systems, mainframe computers, servers, clients, nodes, desktops, mobile devices (e.g., such as smart phones, cellular phones, tablets, personal digital assistants (PDAs), smart watches, and/or the like), embedded computers, dedicated computers, system on a chip (SOC) devices, and/or the like). For example, the inventive system coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the inventive system coordinator may comprise a standalone computer system, a distributed computer system, a node in a computer network (i.e., a network of computer systems organized in a topology), a network of inventive system coordinators, and/or the like. It is to be understood that the coordinator and/or the various coordinator elements (e.g., processor, system bus, memory, input/output devices) may be organized in any number of ways (i.e., using any number and configuration of computer systems, computer networks, nodes, coordinator elements, and/or the like) to facilitate operation of the inventive system. Furthermore, it is to be understood that the various inventive system coordinator computer systems, coordinator computer networks, coordinator nodes, coordinator elements, and/or the like may communicate among each other in any number of ways to facilitate operation of the inventive system. As used in this disclosure, the term "user" refers generally to people and/or computer systems that interact with the inventive system; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The coordinator includes a processor 501 that executes program instructions (e.g., the inventive system program instructions). In various embodiments, the processor may be a general purpose microprocessor (e.g., a central processing unit (CPU), an accelerated processing unit (APU)), a dedicated microprocessor (e.g., a graphics processing unit (GPU), a physics processing unit (PPU), a digital signal processor (DSP), a network processor, a tensor processing unit (TPU), a cryptographic processor, a biometrics processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, an embedded dedicated microprocessor utilized as a coprocessor, registers, cache memory, software), may be synchronous (e.g., using a clock signal) or asynchronous (e.g., without a central clock), and/or the like. For example, the processor may be an AMD Ryzen processor, an AMD Epyc processor, an Intel Core processor, an Intel Xeon processor, an ARM Cortex processor, an Apple A processor, an Apple S processor, a Qualcomm Snapdragon processor, an IBM PowerPC processor, and/or the like.

The processor may be connected to system memory 505 via a system bus 503. The system bus may interconnect these and/or other elements of the coordinator via electrical, electronic, optical, wireless, and/or the like communication links (e.g., the system bus may be integrated into a motherboard that interconnects the coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's Infinity Fabric, Intel's QuickPath Interconnect (QPI), a peripheral component interconnect (PCI) bus, a PCI Express bus, a low pin count (LPC) bus, a universal serial bus (USB), and/or the like. The system memory, in various embodiments, may comprise registers, cache memory (e.g., level one, level two, level three), volatile memory (e.g., random access memory (RAM) (e.g., static RAM (SRAM), dynamic RAM (DRAM)), non-volatile memory (e.g., read only memory (ROM), non-volatile random-access memory (NVRAM) (e.g., resistive random access memory (Re-RAM), magnetoresistive random access memory (MRAM)), flash memory (e.g., NAND-type)), and/or the like. The system memory may utilize error-correcting code (ECC) technology to detect and/or correct internal data corruption. The system memory may be discreet, external, embedded, integrated into a CPU, and/or the like. The processor may access, read from, write to, store in, erase, modify, and/or the like, the system memory in accordance with program instructions (e.g., the inventive system program instructions) executed by the processor. The system memory may facilitate accessing, storing, retrieving, modifying, deleting, and/or the like data (e.g., the inventive system data) by the processor.

In various embodiments, input/output devices 510 may be connected to the processor and/or to the system memory, and/or to one another via the system bus.

In some embodiments, the input/output devices may include one or more graphics devices 511. The processor may make use of the one or more graphic devices in accordance with program instructions (e.g., to inventive system program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., the inventive system data). A video card may be connected to the system bus via an interface such as PCI, PCI Express, USB, PC Card, ExpressCard, Thunderbolt, NVLink, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, video projector, and/or the like) that display graphics. For example, a video card may be an AMD Radeon, an NVIDIA GeForce RTX, an Intel UHD Graphics, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be a Hauppauge ImpactVCB, a Hauppauge WinTV-HVR, a Hauppauge Colossus, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 513. The processor may make use of the one or more audio devices in accordance with program instructions (e.g., the inventive system program instructions) executed by the processor. In one implementation, an audio device may be a sound card that may obtain (e.g., via a connected microphone), process, output (e.g., via connected speakers), and/or the like audio data (e.g., the inventive system data). A sound card may be connected to the system bus via an interface such as PCI, PCI Express, USB, PC Card, ExpressCard, Thunderbolt, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster, and/or the like. An audio device may be discreet, external, embedded, integrated into a motherboard (e.g., via a chipset), and/or the like. An audio device may operate in combination with other audio devices (e.g., in parallel) to provide improved capabilities, data throughput, audio quality, and/or the like.

In some embodiments, the input/output devices may include one or more network devices 515. The processor may make use of the one or more network devices in accordance with program instructions (e.g., the inventive system program instructions) executed by the processor. In one implementation, a network device may be a network card that may obtain (e.g., via a Category 6 Ethernet cable), process, output (e.g., via a wireless antenna), and/or the like network data (e.g., the inventive system data). A network card may be connected to the system bus via an interface such as PCI, PCI Express, USB, FireWire, PC Card, ExpressCard, Thunderbolt, and/or the like. A network card may be a wired network card (e.g., 10/100/1000BASE-T, optical fiber), a wireless network card (e.g., Wi-Fi 802.11ac/ad/ax/ay, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), 5G, and/or the like, satellite modem, FM radio modem, radio-frequency identification (RFID) modem, infrared (IR) modem), and/or the like. For example, a network card may be an Intel Gigabit Adapter, a LINKSYS USB Ethernet Adapter, an ASUS wireless Bluetooth and Gigagbit WiFi adapter, a Motorola SURFboard Cable Modem, a U.S. Robotics Faxmodem, a Zoom ADSL Modem/Router, a TRENDnet Powerline Ethernet Adapter, a StarTech Gigabit Ethernet Multi Mode Fiber Media Converter, a Broadcom NFC controller, a Qualcomm Snapdragon 4G LTE and 5G modem, a Toshiba TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) (e.g., based on IEEE 802.3AD or IEEE 802.1AX standards) may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 517. The processor may make use of the one or more peripheral devices in accordance with program instructions (e.g., the inventive system program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a virtual reality (VR) headset, an augmented reality (AR) headset, a remote control, an audio line-in, an audio line-out, a microphone, headphones, speakers, a subwoofer, an amplifier, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a biometric sensor, a chemical sensor, a magnetometer, a radar, a sonar, a location sensor such as global positioning system (GPS), Galileo, GLONASS, and/or the like), a printer, a fax, a scanner, a copier, a card reader, a fingerprint reader, a pin entry device (PED), a Trusted Platform Module (TPM), a hardware security module (HSM), and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like; wireless such as Wi-Fi, Bluetooth, NFC, cellular, 5G, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the coordinator with a variety of input, output and processing capabilities.

In some embodiments, the input/output devices may include one or more storage devices 519. The processor may access, read from, write to, store in, erase, modify, and/or the like a storage device in accordance with program instructions (e.g., the inventive system program instructions) executed by the processor. A storage device may facilitate accessing, storing, retrieving, modifying, deleting, and/or the like data (e.g., the inventive system data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, Thunderbolt, integrated drive electronics (IDE), serial advanced technology attachment (SATA), non-volatile memory express (NVMe), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, 5G, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool (e.g., for virtual storage, cloud storage, and/or the like). In yet another example, an SSD cache may be used with an HDD to improve speed.

Together and/or separately the system memory 505 and the one or more storage devices 519 may be referred to as memory 520 (i.e., physical memory).

The inventive system memory 520 contains processor-operable (e.g., accessible) the inventive system data stores 530. Data stores 530 comprise data that may be used (e.g., by the inventive system) via the coordinator. Such data may be organized using one or more data formats such as a database (e.g., a relational database with database tables, an object-oriented database, a graph database, a hierarchical database, a key-value NoSQL database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash table, a record, an object, a directed graph, and/or the like. In various embodiments, data stores may be organized in any number of ways (i.e., using any number and configuration of data formats, data structures, the coordinator elements, and/or the like) to facilitate operation of the inventive system. For example, the inventive system data stores may comprise data stores 530*a-d* implemented as one or more databases. A users data store 530*a* may be a collection of database tables that include fields such as UserID, UserName, UserPreferences, and/or the like. A clients data store 530*b* may be a collection of database tables that include fields such as ClientID, ClientName, ClientDeviceType, ClientScreenResolution, and/or the like. A rules data store 530*c* may be a collection of database tables. A sessions data store 530*d* may be a collection of database tables that include fields such as SessionID, SessionStartTime, SessionEndTime, ExtractedFieldsDetails, and/or the like. The coordinator may use data stores 530 to keep track of inputs, parameters, settings, variables, records, outputs, and/or the like.

Memory 520 of the inventive system contains processor-operable (e.g., executable) components 540. Components 540 comprise program components (including program instructions and any associated data stores) that are executed (e.g., by the inventive system) via the coordinator (i.e., via the processor) to transform inputs of the inventive system into outputs of the inventive system. It is to be understood that the various components and their subcomponents, capabilities, applications, and/or the like may be organized in any number of ways (i.e., using any number and configuration of components, subcomponents, capabilities, applications, coordinator elements, and/or the like) to facilitate operation of the inventive system. Furthermore, it is to be understood that the various components and their subcomponents, capabilities, applications, and/or the like may communicate among each other in any number of ways to facilitate operation of the inventive system. For example, the various components and their subcomponents, capabilities, applications, and/or the like may be combined, integrated, consolidated, split up, distributed, and/or the like in any number of ways to facilitate operation of the inventive system. In another example, a single or multiple instances of the various components and their subcomponents, capabilities, applications, and/or the like may be instantiated on each of a single coordinator node, across multiple coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), web frameworks (e.g., Ruby on Rails, AngularJS), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 540 may include an operating environment component 540*a*. The operating environment component may facilitate operation of the inventive system via various subcomponents.

In some implementations, the operating environment component may include an operating system subcomponent. The operating system subcomponent may provide an abstraction layer that facilitates the use of, communication among, common services for, interaction with, security of, and/or the like of various coordinator elements, components, data stores, and/or the like.

In some embodiments, the operating system subcomponent may facilitate execution of program instructions (e.g., the inventive system program instructions) by the processor by providing process management capabilities. For example, the operating system subcomponent may facilitate the use of multiple processors, the execution of multiple processes, the execution of multiple threads, multitasking, and/or the like.

In some embodiments, the operating system subcomponent may facilitate the use of memory by the inventive system. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Apple File System (APFS), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the coordinator as a node in a computer network by providing support for one or more communications protocols. For example, the operating system subcomponent may include support for the internet protocol suite (i.e., Transmission Control Protocol/Internet Protocol (TCP/IP)) of network protocols such as IP, IPsec, Mobile IP, TCP, User Datagram Protocol (UDP), and/or the like. In another example, the operating system subcomponent may include support for security protocols (e.g., Wired Equivalent Privacy (WEP), Wi-Fi Protected Access (WPA), WPA2, WPA3) for wireless computer networks. In yet another example, the operating system subcomponent may include support for virtual private networks (VPNs).

In some embodiments, the operating system subcomponent may facilitate security of the coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the inventive system by providing user interface elements that may be used by the inventive system to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, JavaFX, jQuery UI, GTK, Qt, and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Windows Metro, macOS X Aqua, macOS X Flat, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 10, Apple Mac OS X, Apple iOS, Google Android, and/or the like.

In some implementations, the operating environment component may include a database subcomponent. The database subcomponent may facilitate inventive system capabilities such as storage, analysis, retrieval, access, modification, deletion, aggregation, generation, and/or the like of data (e.g., the use of data stores 530). The database subcomponent may make use of database languages (e.g., Structured Query Language (SQL), XQuery, Cassandra Query Language (CQL)), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, MongoDB, and/or the like.

In some implementations, the operating environment component may include an information handling subcomponent. The information handling subcomponent may provide the inventive system with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent, Bitcoin), and/or the like to handle communication of information such as web pages, files, multimedia content (e.g., streaming media), applications, transactions, and/or the like.

In some embodiments, the information handling subcomponent may facilitate the serving of information to users, components of the inventive system, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 530) via the database subcomponent.

In some embodiments, the information handling subcomponent may facilitate presentation of information obtained from users, components of the inventive system, nodes in a computer network, web servers, and/or the like. For example, the information handling subcomponent may comprise a web browser such as Microsoft Internet Explorer, Microsoft Edge, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate message of the inventive system communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, Messaging Application Programming Interface (MAPI), Facebook API, a custom protocol, and/or the like to facilitate message communications of the inventive system. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Domino, IBM Notes, Gmail, ICQ, Trillian, Skype, Google Hangouts, Apple FaceTime, Apple iChat, Facebook Chat, and/or the like.

In some implementations, the operating environment component may include a security subcomponent that facilitates the inventive system security. In some embodiments, the security subcomponent may restrict access to the inventive system, to one or more services provided by the inventive system, to data associated with the inventive system (e.g., stored in data stores 530), to communication messages associated with the inventive system, and/or the like to authorized users. Access may be granted via a login screen, via an API that obtains authentication information, via an authentication token, via a cryptographic key (e.g., stored in an HSM), and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, multi-factor authentication, and/or the like may be used to control access. For example, the security subcomponent may facilitate digital rights management (DRM), network intrusion detection, firewall capabilities, cryptographic wallet access (e.g., for cryptocurrencies such as Bitcoin, Ethereum, and/or the like), and/or the like.

In some embodiments, the security subcomponent may use cryptographic techniques to secure information (e.g., by storing encrypted data), verify message authentication (e.g., via a digital signature), provide integrity checking (e.g., a checksum), authorize transactions (e.g., using a private key), and/or the like by facilitating encryption and/or decryption of data. Furthermore, steganographic techniques may be used instead of or in combination with cryptographic techniques. Cryptographic techniques used by the inventive system may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Elliptic Curve Digital Signature Algorithm (ECDSA)), cryptographic hash functions (e.g., using algorithms such as Message-Digest 5 (MD5), Secure Hash Algorithm 3 (SHA-3)), and/or the like. For example, the security subcomponent may comprise a cryptographic system such as Pretty Good Privacy (PGP).

In some implementations, the operating environment component may include a virtualization subcomponent that facilitates virtualization capabilities of the inventive system. The virtualization subcomponent may include hypervisors (e.g., Type-1 native hypervisors, Type-2 hosted hypervisors), virtual machines (VMs), and/or the like. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via processing resources virtualization, memory virtualization, storage virtualization, data virtualization, network virtualization, and/or the like. For example, the virtualization subcomponent may comprise VMware software suite (e.g., VMware Workstation, VMware Player, VMware ESXi, VMware ThinApp, VMware Infrastructure), Parallels software suite (e.g., Parallels Server, Parallels Desktop), Virtuozzo software suite (e.g., Virtuozzo Infrastructure Platform, Virtuozzo), Oracle software suite (e.g., Oracle VM Server for SPARC, Oracle VM Server for x86, Oracle VM VirtualBox, Oracle Solaris 11), Wine, and/or the like.

In some embodiments, components 540 may include a user interface component 540b. The user interface component may facilitate user interaction with the inventive system by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 540 may include any of the components. described in more detail in preceding figures and/or in appendices. The entirety of this disclosure (including the written description, figures, claims, abstract, appendices, and/or the like) for "A SYSTEM FOR SIMULTANEOUS RECORDING OF THE PIXELS OF A SCREEN AND OF ACCESSIBILITY DATA," shows various embodiments via which the claimed innovations may be practiced. It is to be understood that these embodiments and the features they describe are a representative sample presented to assist in understanding the claimed innovations and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the inventive system coordinator, the inventive system coordinator elements, the inventive system data stores, the inventive system components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the inventive system coordinator, the inventive system coordinator elements, the inventive system data stores, the inventive system components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the inventive system discussed in this disclosure have been directed to simultaneously recording and capturing digital activity on apps user devices, the innovations described in this disclosure may be readily applied to a wide variety of other fields and/or applications.

What is claimed is:

1. A method for simultaneously recording video and capturing structural data to provide a view of user interface elements exposed on a user's screen of a user device, the method comprising:
    recording a video of pixels of the user's screen on a user device and entering a recording state;
    marking the video with a timestamp with the video start time;
    simultaneously capturing at least one snapshot of hierarchical data structure of user interface elements via an accessibility application programming interface during the recording of the video pixels in the recording state;
    marking the at least one snapshot with a timestamp;
    continuously polling the accessibility application programming interface, wherein the at least one snapshot is queried recursively starting at an exposed user interface element, wherein the exposed user interface element has zero or more child user interface elements, providing a hierarchy of user interface elements and a data structure of the exposed user interface at a moment in time;
    comparing the data structure to a previously stored data structure and storing the data structure when there is a change from the previously stored data structure;
    simultaneously recording the video and the at least one snapshot of hierarchical data structure of user interface elements until the user selects to stop recording;
    exiting the recording state;
    storing the video and the at least one snapshot of hierarchical data structure of user interface elements as a session; and
    synchronizing the recorded video and the at least one snapshot of hierarchical data structure of user interface elements for playback.

2. The method as recited in claim 1, wherein the recording state is a loop of continuously polling of the accessibility application programming interface, accessibility events triggering a reading of the accessibility application programming interface, other events causing the reading of the accessibility application programming interface, or a combination thereof.

3. The method as recited in claim 2, wherein the loop runs on a background thread.

4. The method as recited in claim 2, wherein when the reading of the accessibility application programming interface is triggered in the recording state, a view is provided of all user interface elements exposed on the user device via the accessibility application programming interface.

5. The method as recited in claim 1, wherein the data structure is temporarily stored on the user device.

6. The method as recited in claim 1, wherein marking the at least one snapshot with a timestamp represents a time a data structure process started or a time the data structure process ended.

7. The method as recited in claim 1, further comprising storing metadata associated with the session after the recording state is exited.

8. The method as recited in claim 1, further comprising finalizing storage of the session and associating a session identifier.

9. The method as recited in claim 1, wherein the exposed user interface element also includes a user interface event.

10. The method as recited in claim 1, further comprising the user granting permission to the system to access and record the user device.

11. A system for simultaneously recording video and capturing structural data to provide a view of user interface elements exposed on a screen of a user's device, the system comprising:
    a recording device, wherein the recording device records a video of pixels of the user screen and at least one simultaneous snapshot of hierarchical data structure of at least one user interface element via the accessibility application programming interface during the recording of the video of pixels;

a clock timer, wherein the clock timer provides a timestamp of the recorded video and the at least one snapshot;

the accessibility application programming interface, wherein the accessibility application programming interface is adapted to recursively query the at least one snapshot starting with an exposed user interface element, wherein the exposed user interface element has zero or more child user interface elements, and provide a hierarchical data structure of the exposed user interface element at a moment in time;

comparing the hierarchical data structure to a previously stored hierarchical data structure and storing the hierarchical data structure when there is a change from the previously hierarchical stored data structure;

a storage device adapted to store the video of pixels of the user screen and the at least one simultaneous snapshot of hierarchical data structure together as a session; and a playback device, adapted to play the recorded video of pixels and the at least one snapshot simultaneously.

12. The system as recited in claim 11, wherein the playback device adapted to play the recorded video of pixels and the at least one snapshot simultaneously plays retrospectively and retains their synchronization and displays an exact state of user interface elements as exposed by the accessibility API at the specific moment in time.

13. The system as recited in claim 11, wherein the system and the recording device run on the user device that is being recorded.

14. The system as recited in claim 11, wherein the session may be uploaded to a server via a network.

15. The system as recited in claim 11, further comprising a second system running on a second device, wherein one or more stored sessions are downloaded to the second system.

16. The system as recited in claim 15, wherein the second system allows a user to play, pause, and/or scrub the downloaded session.

* * * * *